(12) United States Patent
Heath et al.

(10) Patent No.: US 9,527,786 B1
(45) Date of Patent: Dec. 27, 2016

(54) COMPRESSOR EQUIPPED EMISSIONS FREE DEHYDRATOR

(71) Applicants: Rodney T. Heath, Farmington, NM (US); Forrest D. Heath, Katy, TX (US); Gary Heath, Farmington, NM (US)

(72) Inventors: Rodney T. Heath, Farmington, NM (US); Forrest D. Heath, Katy, TX (US); Gary Heath, Farmington, NM (US)

( * ) Notice: Subject to any disclaimer, the term of this patent is extended or adjusted under 35 U.S.C. 154(b) by 314 days.

(21) Appl. No.: 14/213,253

(22) Filed: Mar. 14, 2014

Related U.S. Application Data

(60) Provisional application No. 61/793,149, filed on Mar. 15, 2013.

(51) Int. Cl.
| | | |
|---|---|---|
| *C07C 7/09* | (2006.01) | |
| *B01D 53/18* | (2006.01) | |
| *B01D 53/26* | (2006.01) | |
| *B01D 53/14* | (2006.01) | |

(52) U.S. Cl.
CPC ............ *C07C 7/09* (2013.01); *B01D 53/1425* (2013.01); *B01D 53/18* (2013.01); *B01D 53/263* (2013.01)

(58) Field of Classification Search
None
See application file for complete search history.

(56) References Cited

U.S. PATENT DOCUMENTS

| | | | |
|---|---|---|---|
| 844,694 A | 2/1907 | Smith | |
| 1,903,481 A | 4/1933 | Schweisthal | |
| 2,225,959 A | 12/1940 | Miller | |
| 2,726,729 A | 12/1955 | Williams | |
| 2,738,026 A | 3/1956 | Glasgow et al. | |
| 2,765,872 A | 10/1956 | Hartman et al. | |
| 2,786,543 A | 3/1957 | Hayes et al. | |
| 2,812,827 A | 11/1957 | Worley et al. | |
| 2,815,901 A | 12/1957 | Hale | |
| 2,853,149 A | 9/1958 | Gosselin | |
| 2,937,140 A | 5/1960 | Stinson | |
| 2,970,107 A | 1/1961 | Gilmore | |
| 2,984,360 A | 5/1961 | Smith | |
| 3,018,640 A | 1/1962 | Heller et al. | |
| 3,025,928 A | 3/1962 | Heath | |
| 3,027,651 A | 4/1962 | Nerge | |
| 3,094,574 A | 6/1963 | Glasgow et al. | |
| 3,105,855 A | 10/1963 | Meyers | |
| 3,119,674 A | 1/1964 | Glasgow et al. | |
| 3,152,753 A | 10/1964 | Adams | |

(Continued)

FOREIGN PATENT DOCUMENTS

| | | |
|---|---|---|
| AR | 011862 | 9/2000 |
| AR | 024366 | 10/2002 |

(Continued)

OTHER PUBLICATIONS

"Environmental Technology Verification Report", Greenhouse Gas Technology Center Southern Research Institute.

(Continued)

*Primary Examiner* — Tam M Nguyen
(74) *Attorney, Agent, or Firm* — Peacock Myers, P.C.; Justin Jackson; Deborah Peacock

(57) ABSTRACT

An emissions free dehydrator which can be used in conjunction with a compressor that compresses hydrocarbon vapors and gases. The dehydrator can capture virtually all hydrocarbon liquids and vapors produced by the process of removing water vapor from a flowing gas stream.

8 Claims, 1 Drawing Sheet

(56) References Cited

U.S. PATENT DOCUMENTS

| | | |
|---|---|---|
| 3,182,434 A | 5/1965 | Fryar |
| 3,232,027 A | 2/1966 | Lorenz et al. |
| 3,237,847 A | 3/1966 | Wilson |
| 3,254,473 A | 6/1966 | Fryar et al. |
| 3,255,573 A | 6/1966 | Cox, Jr. et al. |
| 3,288,448 A | 11/1966 | Patterson et al. |
| 3,321,890 A | 5/1967 | Barnhart |
| 3,347,019 A | 10/1967 | Barnhart |
| 3,360,127 A | 12/1967 | Wood, Jr. |
| 3,396,512 A | 8/1968 | McMinn et al. |
| 3,398,723 A | 8/1968 | Smalling |
| 3,407,052 A | 10/1968 | Huntress et al. |
| 3,528,758 A | 9/1970 | Perkins |
| 3,540,821 A | 11/1970 | Siegmund |
| 3,541,763 A | 11/1970 | Heath et al. |
| 3,589,984 A | 6/1971 | Reid |
| 3,616,598 A | 11/1971 | Floral, Jr. |
| 3,648,434 A | 3/1972 | Gravis, III et al. |
| 3,659,401 A | 5/1972 | Giammarco |
| 3,662,017 A | 5/1972 | Woerner et al. |
| 3,672,127 A | 6/1972 | Mayse et al. |
| 3,736,725 A | 6/1973 | Alleman et al. |
| 3,817,687 A | 6/1974 | Cavallero et al. |
| 3,829,521 A | 8/1974 | Green |
| 3,855,337 A | 12/1974 | Foral, Jr. et al. |
| 3,872,682 A | 3/1975 | Shook |
| 3,949,749 A | 4/1976 | Stewart |
| 3,989,487 A | 11/1976 | Peterson |
| 4,009,985 A | 3/1977 | Hirt |
| 4,010,009 A | 3/1977 | Moyer |
| 4,010,065 A | 3/1977 | Alleman |
| 4,058,147 A | 11/1977 | Stary et al. |
| 4,098,303 A | 7/1978 | Gammell |
| 4,108,618 A | 8/1978 | Schneider |
| 4,118,170 A | 10/1978 | Hirt |
| 4,134,271 A | 1/1979 | Datis |
| 4,139,596 A | 2/1979 | Vaseen |
| 4,162,145 A | 7/1979 | Alleman |
| 4,165,618 A | 8/1979 | Tyree, Jr. |
| 4,198,214 A | 4/1980 | Heath et al. |
| 4,270,938 A | 6/1981 | Schmidt et al. |
| 4,286,929 A | 9/1981 | Heath et al. |
| 4,305,895 A | 12/1981 | Heath et al. |
| 4,322,265 A | 3/1982 | Wood |
| 4,332,643 A | 6/1982 | Reid |
| 4,342,572 A | 8/1982 | Heath |
| 4,362,462 A | 12/1982 | Blotenberg |
| 4,369,049 A | 1/1983 | Heath |
| 4,396,371 A | 8/1983 | Lorenz et al. |
| 4,402,652 A | 9/1983 | Gerlach et al. |
| 4,421,062 A | 12/1983 | Padilla, Sr. |
| 4,431,433 A | 2/1984 | Gerlach et al. |
| 4,435,196 A | 3/1984 | Pielkenrood |
| 4,459,098 A | 7/1984 | Turek et al. |
| 4,462,813 A | 7/1984 | May et al. |
| 4,474,549 A | 10/1984 | Capone |
| 4,474,550 A | 10/1984 | Heath et al. |
| 4,493,770 A | 1/1985 | Moilliet |
| 4,501,253 A | 2/1985 | Gerstmann et al. |
| 4,505,333 A | 3/1985 | Ricks |
| 4,511,374 A | 4/1985 | Heath |
| 4,539,023 A | 9/1985 | Boley |
| 4,568,268 A | 2/1986 | Gerlach et al. |
| 4,579,565 A | 4/1986 | Heath |
| 4,583,998 A | 4/1986 | Reid et al. |
| 4,588,372 A | 5/1986 | Torborg |
| 4,588,424 A | 5/1986 | Heath et al. |
| 4,597,733 A | 7/1986 | Dean et al. |
| 4,615,673 A | 10/1986 | Heath et al. |
| 4,617,030 A | 10/1986 | Heath |
| 4,659,344 A | 4/1987 | Gerlach et al. |
| 4,674,446 A | 6/1987 | Padilla, Sr. |
| 4,676,806 A | 6/1987 | Dean et al. |
| 4,689,053 A | 8/1987 | Heath |
| 4,701,188 A | 10/1987 | Mims |
| 4,715,808 A | 12/1987 | Heath et al. |
| 4,737,168 A | 4/1988 | Heath |
| 4,778,443 A | 10/1988 | Sands et al. |
| 4,780,115 A | 10/1988 | Ranke |
| 4,824,447 A | 4/1989 | Goldsberry |
| 4,830,580 A | 5/1989 | Hata et al. |
| 4,919,777 A | 4/1990 | Bull |
| 4,948,393 A | 8/1990 | Hodson et al. |
| 4,949,544 A | 8/1990 | Hines |
| 4,978,291 A | 12/1990 | Nakai |
| 4,983,364 A | 1/1991 | Buck et al. |
| 5,016,447 A | 5/1991 | Lane et al. |
| 5,080,802 A | 1/1992 | Cairo, Jr. et al. |
| 5,084,074 A | 1/1992 | Beer et al. |
| 5,129,925 A | 7/1992 | Marsala et al. |
| 5,130,078 A | 7/1992 | Dillman |
| 5,132,011 A | 7/1992 | Ferris |
| 5,163,981 A | 11/1992 | Choi |
| 5,167,675 A | 12/1992 | Rhodes |
| 5,191,990 A | 3/1993 | Fritts |
| 5,195,587 A | 3/1993 | Webb |
| 5,209,762 A | 5/1993 | Lowell |
| 5,249,739 A | 10/1993 | Bartels et al. |
| 5,269,886 A | 12/1993 | Brigham |
| 5,346,537 A | 9/1994 | Lowell |
| 5,377,723 A | 1/1995 | Hilliard |
| 5,419,299 A | 5/1995 | Fukasawa et al. |
| 5,453,114 A | 9/1995 | Ebeling |
| 5,476,126 A | 12/1995 | Hilliard et al. |
| 5,490,873 A | 2/1996 | Behrens et al. |
| 5,501,253 A | 3/1996 | Weiss |
| 5,513,680 A | 5/1996 | Hilliard et al. |
| 5,536,303 A | 7/1996 | Ebeling |
| 5,571,310 A | 11/1996 | Nanaji |
| 5,579,740 A | 12/1996 | Cotton et al. |
| 5,626,027 A | 5/1997 | Dormer et al. |
| 5,664,144 A | 9/1997 | Yanai et al. |
| 5,665,144 A | 9/1997 | Hill et al. |
| 5,678,411 A | 10/1997 | Matsumura et al. |
| 5,755,854 A | 5/1998 | Nanaji |
| 5,766,313 A | 6/1998 | Heath |
| 5,826,433 A | 10/1998 | Dube |
| 5,857,616 A | 1/1999 | Karnoff et al. |
| 5,878,725 A | 3/1999 | Osterbrink |
| 5,882,486 A | 3/1999 | Moore |
| 5,885,060 A | 3/1999 | Cunkelman et al. |
| 5,988,232 A | 11/1999 | Koch et al. |
| 6,004,380 A | 12/1999 | Landreau et al. |
| 6,010,674 A | 1/2000 | Miles et al. |
| 6,023,003 A | 2/2000 | Dunning et al. |
| 6,027,311 A | 2/2000 | Hill et al. |
| 6,095,793 A | 8/2000 | Greeb |
| 6,142,191 A | 11/2000 | Sutton et al. |
| 6,183,540 B1 | 2/2001 | Thonsgaard |
| 6,193,500 B1 | 2/2001 | Bradt et al. |
| 6,223,789 B1 | 5/2001 | Koch |
| 6,224,369 B1 | 5/2001 | Moneyhun |
| 6,238,461 B1 | 5/2001 | Heath |
| 6,251,166 B1 | 6/2001 | Anderson |
| 6,273,937 B1 | 8/2001 | Schucker |
| 6,299,671 B1 | 10/2001 | Christensen |
| 6,314,981 B1 | 11/2001 | Mayzou et al. |
| 6,332,408 B2 | 12/2001 | Howlett |
| 6,363,744 B2 | 4/2002 | Finn et al. |
| 6,364,933 B1 | 4/2002 | Heath |
| 6,425,942 B1 | 7/2002 | Forster |
| 6,461,413 B1 | 10/2002 | Landreau et al. |
| 6,478,576 B1 | 11/2002 | Bradt et al. |
| 6,499,476 B1 | 12/2002 | Reddy |
| 6,532,999 B2 | 3/2003 | Pope et al. |
| 6,533,574 B1 | 3/2003 | Pechoux |
| 6,537,349 B2 | 3/2003 | Choi et al. |
| 6,537,458 B1 | 3/2003 | Polderman |
| 6,551,379 B2 | 4/2003 | Heath |
| 6,604,558 B2 | 8/2003 | Sauer |
| 6,616,731 B1 | 9/2003 | Hillstrom |
| 6,719,824 B1 | 4/2004 | Bowser |
| 6,745,576 B1 | 6/2004 | Granger |
| 6,931,919 B2 | 8/2005 | Weldon |

(56) References Cited

U.S. PATENT DOCUMENTS

| | | |
|---|---|---|
| 6,984,257 B2 | 1/2006 | Heath et al. |
| 7,005,057 B1 | 2/2006 | Kalnes |
| 7,025,084 B2 | 4/2006 | Perry et al. |
| 7,131,265 B2 | 11/2006 | Lechner |
| RE39,944 E | 12/2007 | Heath |
| 7,350,581 B2 | 4/2008 | Wynn |
| 7,481,237 B2 | 1/2009 | Jones et al. |
| 7,497,180 B2 | 3/2009 | Karlsson et al. |
| 7,531,030 B2 | 5/2009 | Heath et al. |
| 7,575,672 B1 | 8/2009 | Gilmore |
| 7,791,882 B2 | 9/2010 | Chu et al. |
| 7,905,722 B1 | 3/2011 | Heath et al. |
| 8,529,215 B2 | 9/2013 | Heath et al. |
| 8,840,703 B1 | 9/2014 | Heath et al. |
| 8,864,887 B2 | 10/2014 | Heath et al. |
| 8,900,343 B1 | 12/2014 | Heath et al. |
| 9,291,409 B1 | 3/2016 | Heath et al. |
| 2001/0008073 A1 | 7/2001 | Finn et al. |
| 2002/0073843 A1 | 6/2002 | Heath |
| 2002/0081213 A1 | 6/2002 | Takahashi et al. |
| 2002/0178918 A1 | 12/2002 | Lecomte et al. |
| 2002/0185006 A1 | 12/2002 | Lecomte et al. |
| 2003/0005823 A1 | 1/2003 | Le Blanc et al. |
| 2003/0167690 A1 | 9/2003 | Edlund et al. |
| 2004/0031389 A1 | 2/2004 | Heath et al. |
| 2004/0186630 A1 | 9/2004 | Shier et al. |
| 2004/0211192 A1 | 10/2004 | Lechner |
| 2005/0115248 A1 | 6/2005 | Koehler et al. |
| 2005/0266362 A1 | 12/2005 | Stone et al. |
| 2006/0144080 A1 | 7/2006 | Heath et al. |
| 2006/0156744 A1 | 7/2006 | Cusiter et al. |
| 2006/0156758 A1 | 7/2006 | An et al. |
| 2006/0218900 A1 | 10/2006 | Lechner |
| 2006/0254777 A1 | 11/2006 | Wynn |
| 2006/0260468 A1 | 11/2006 | Amin |
| 2007/0051114 A1 | 3/2007 | Mahlanen |
| 2007/0084341 A1 | 4/2007 | Heath et al. |
| 2007/0151292 A1 | 7/2007 | Heath et al. |
| 2007/0175226 A1 | 8/2007 | Karlsson et al. |
| 2007/0186770 A1 | 8/2007 | Heath et al. |
| 2007/0199696 A1 | 8/2007 | Walford |
| 2008/0008602 A1 | 1/2008 | Pozivil et al. |
| 2008/0120993 A1 | 5/2008 | An et al. |
| 2009/0133578 A1 | 5/2009 | Brasa et al. |
| 2009/0223246 A1 | 9/2009 | Heath et al. |
| 2010/0040989 A1 | 2/2010 | Heath et al. |
| 2010/0083678 A1 | 4/2010 | Lifson et al. |
| 2010/0083691 A1 | 4/2010 | Immink et al. |
| 2010/0263393 A1 | 10/2010 | Chen et al. |
| 2010/0313586 A1 | 12/2010 | Yakumaru et al. |
| 2012/0079851 A1 | 4/2012 | Heath et al. |
| 2012/0261092 A1 | 10/2012 | Heath et al. |
| 2013/0319844 A1 | 12/2013 | Heath et al. |

FOREIGN PATENT DOCUMENTS

| | | |
|---|---|---|
| CA | 2281610 | 9/1998 |
| CA | 2426071 | 10/2003 |
| CA | 2224389 | 2/2008 |
| CA | 2311440 | 6/2011 |
| CA | 2563747 | 5/2013 |
| CA | 2523110 | 8/2014 |
| CA | 2541606 | 10/2014 |
| CA | 2809118 | 2/2015 |
| CA | 2573514 | 9/2015 |
| FR | 2542039 | 9/1984 |
| GB | 370591 | 4/1932 |
| GB | 573819 | 12/1945 |
| JP | 58185990 A | 10/1983 |
| RU | 1801092 | 3/1993 |
| RU | 2159913 | 11/2000 |
| SU | 1021809 | 6/1983 |
| WO | 2005/068847 | 7/2005 |
| WO | 2010/080040 | 7/2010 |
| WO | 2013/170190 | 11/2013 |

OTHER PUBLICATIONS

"Natural Gas Dehydration", The Environmental Technology Verification Program, Sep. 2003.

Archer, "TEG Regenerator Vapor Recovery in Amoco's Northwestern Business Unit", Amoco Northwestern Business Unit, Aug. 1992.

Reid, "Coldfinger an Exhauster for Removing Trace Quantities of Water from Glycol Solutions Used for Gas Dehydration", Ball-Reid Engineers, Inc., Oklahoma City, Oklahoma, 1975, 592-602.

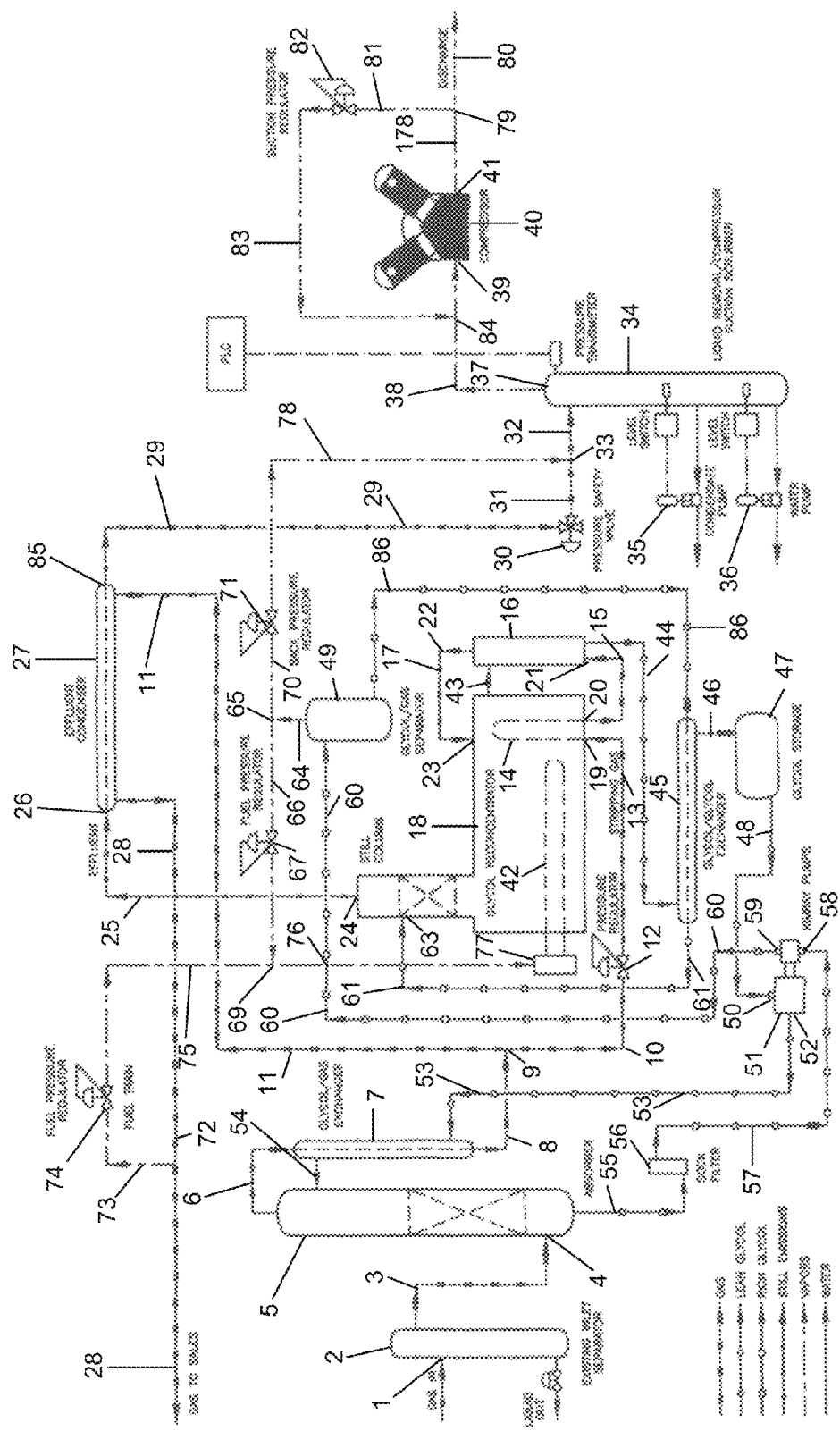

COMPRESSOR EQUIPPED EMISSIONS FREE DEHYDRATOR

CROSS-REFERENCE TO RELATED APPLICATIONS

This application claims priority to and the benefit of the filing of U.S. Provisional Patent Application Ser. No. 61/793,149, entitled "Compressor Equipped Emissions Free Dehydrator", filed on Mar. 15, 2013, and the specification thereof is incorporated herein by reference.

BACKGROUND OF THE INVENTION

Field of the Invention (Technical Field)

An embodiment of the present invention relates to a compressor equipped emissions free dehydrator which can preferably capture at least substantially all hydrocarbon liquids and vapors produced by the process of removing water vapor from a flowing gas stream.

Description of Related Art

A conventional dehydrator contacts in a pressure vessel (absorber) the flowing gas stream. Normally, triethylene glycol is used as the contact medium. The triethylene glycol absorbs water vapor contained in the gas as well as some of the gas aromatics, (such as benzene, ethylbenzene, toluene, and xylenes commonly referred to as BTEX). The wet glycol (commonly called rich glycol) exits the absorber and is sent to a heated vessel (reboiler) where the glycol is heated to approximately 400 degrees F. Heating the glycol drives off the absorbed water as well as the absorbed BTEX (BTEX is a hazardous waste that has been proven to be carcinogenic). The heated stream of steam, BTEX, and other hydrocarbons exits the reboiler at approximately atmospheric pressure and 400 degrees F. To prevent atmospheric pollution, the heated stream must be processed to capture all the BTEX and any other hydrocarbon products the stream might contain.

Although BTEX is the major concern as a gas dehydration hazardous waste, there are other hazardous wastes such as methane gas (which may contain other hydrocarbon components) produced by the dehydration process. Most methane produced by gas dehydration is caused by glycol pumps, gas stripping of the rich glycol, and flashing as the rich glycol is released from high pressure to atmospheric pressure. There is thus a present need for a method, system, and apparatus which can capture the emissions and compress them to in excess of 200 pounds per square inch gauge pressure ("psig").

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF SUMMARY OF EMBODIMENTS OF THE PRESENT INVENTION

An embodiment of the present invention relates to a method for dehydrating a hydrocarbon-containing gas which includes drying the hydrocarbon-containing gas in an absorber; directing the hydrocarbon-containing gas through a first heat exchanger after it has exited the absorber and before splitting a flow of the hydrocarbon-containing gas into a first portion of the hydrocarbon-containing gas and a second portion of the hydrocarbon-containing gas, wherein the second portion of the hydrocarbon-containing gas has its pressure reduced by a pressure regulator; directing the first portion of the hydrocarbon-containing gas to a second heat exchanger before directing the first portion of the hydrocarbon-containing gas to a stripping column, the second heat exchanger incorporated into a re-boiler; directing the first portion of the hydrocarbon-containing gas from the stripping column to the reboiler; and the first portion of the hydrocarbon-containing gas exiting a still column of the reboiler before directing the first portion of the hydrocarbon-containing gas to a condenser.

The method can also include first portion of the hydrocarbon-containing gas being cooled in the condenser at least in part by the second portion of the hydrocarbon-containing gas; passing the hydrocarbon-containing gas through an inlet separator before drying it in the absorber; and configuring the re-boiler to function as a glycol reconcentrator.

In one embodiment, after the second portion of the hydrocarbon-containing gas is directed through the condenser, it is directed to a gas sales line. Optionally, after exiting the condenser, the first portion of the hydrocarbon-containing gas is directed to a three-phase separator. In addition, gases exiting the three-phase separator can be directed to a compressor.

An embodiment of the present invention also relates to a dehydrator having an absorber with an outlet in fluid communication with a first heat exchanger, an outlet of the first heat exchanger in fluid communication with a pressure regulator, the pressure regulator in fluid communication with a second heat exchanger, the second heat exchanger disposed at least partially in a re-boiler, the reboiler comprising a stripping column; and the stripping column comprising an inlet in fluid communication with an outlet of the second heat exchanger and the stripping column comprising an outlet in fluid communication with an inlet of the re-boiler. An outlet of a still column of said re-boiler is in fluid communication with a first entrance of a condenser. The condenser can include a second entrance in fluid communication with the first heat exchanger. Optionally, an outlet of an inlet separator can be in fluid communication with the absorber. The first outlet of the condenser can be in fluid communication with a gas sales line. A second outlet of the condenser can be in fluid communication with an inlet of a three-phase separator. A gas outlet of the three-phase separator can be in fluid communication with an inlet of a compressor.

Objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated into and forms a part of the specification, illustrates one or more embodiments of the present invention and, together with the description, serves to explain the principles of the invention. The drawing is only for the purpose of illustrating one or more preferred embodiments of the invention and is not to be construed as limiting the invention.

FIG. 1 is a flow diagram illustrating an embodiment of the present invention.

DETAILED DESCRIPTION OF THE INVENTION

Regardless of the source, a compressor equipped emissions free dehydrator according to an embodiment of the present invention can preferably capture the emissions and compress them to in excess of 200 psig. Although a user can optionally choose to direct them to a different location, in one embodiment, after compression, the captured emissions are preferably introduced into the inlet scrubber of another compressor to be compressed into the sales line and sold with the other gas.

After compression, the captured emissions are generally introduced into the inlet scrubber of another compressor to be compressed into the sales line and sold with the other gas.

The major equipment added to a standard dehydrator to capture the emissions are a condenser to receive the effluent from the reboiler still column, a three-phased separator to receive and send to storage or disposal the condensed liquids (water and hydrocarbons) condensed from the effluent exiting the still column of the reboiler, and a compressor (screw or reciprocating) to compress the uncondensed portion of the effluent from the still column and the methane produced by the dehydration process from ounces psig to pounds psig.

Referring to FIG. 1, the components of a standard dehydrator are illustrated, as well as the components necessary to convert it to an emissions free unit in accordance with an embodiment of the present invention. As illustrated therein, gas to be dehydrated at an elevated pressure in excess of 100 psig preferably enters inlet separator 2 at inlet 1. The gas preferably exits inlet separator 2 and flows through line 3 to inlet 4 of absorber 5. While flowing through absorber 5, the gas preferably contacts a dehydrating agent, which can optionally include dry triethlene glycol, the drying agent, preferably absorbs water vapor and aromatic hydrocarbons (BTEX) from the gas.

In one embodiment, the gas exits absorber 5 and flows through line 6 into heat exchanger 7, which can be a gas to glycol heat exchanger. The gas then preferably exits gas to glycol heat exchanger 7 and flows through line 8 to point 9. At point 9, the gas line preferably splits into lines 10 and 11. From point 9, some of the dehydrated gas preferably flows through line 10 to pressure regulator 12. Pressure regulator 12 preferably reduces the gas pressure to approximately 3 psig. The pressure setting of regulator 12 can be user-determined and can optionally be determined based upon the pressure needed to establish the volume of gas required for gas stripping of the glycol.

The volume of gas being used for gas stripping of the glycol is preferably indicated, optionally via a meter (not shown). From regulator 12, the gas preferably flows through line 13 to inlet 19 of gas to glycol heat exchanger 14. Gas to glycol heat exchanger 14 is preferably immersed, at least partially, in the hot glycol contained in reboiler 18. The gas preferably flows through heat exchanger 14 to be heated before exiting at outlet 20. As further illustrated in FIG. 1, the gas then flows through line 15 to the inlet 21 of stripping column 16.

In one embodiment, while flowing through stripping column 16 the hot, dehydrated gas preferably contacts the hot regenerated glycol exiting reboiler 18, further removing water from the regenerated glycol and super concentrating the glycol. The stripping gas preferably exits the stripping column at outlet 22 and flows through line 17 to enter reboiler 18 at point 23. In this embodiment, the stripping gas flows through reboiler 18, mixing with the water vapor and hydrocarbons being released from the rich glycol by heating in reboiler 18. The heated mixture of steam and hydrocarbons (hereinafter referred to as effluent) exits reboiler 18 at still column outlet 24. The effluent then preferably flows through line 25 to enter effluent condenser 27 at inlet 26. The effluent flows through effluent condenser 27, where it is cooled by the dehydrated gas flowing from point 9, through line 11, effluent condenser 27 and line 28 to sales.

In one embodiment, instead of using the sales gas, effluent condenser 27 can also optionally be cooled by circulating through the condenser glycol that has been air or gas cooled. Cooling of the effluent results in a quantity of the water and hydrocarbon vapors, in the effluent, condensing from the vapor to the liquid phase. A stream of water, liquid hydrocarbons, and uncondensed vapors can preferably exit condenser 27 at outlet 85. The uncondensed vapors and condensed liquids flow through line 29 to three-way safety valve 30. Three-way valve 30 preferably provides pressure relief for reboiler 18 and other components of the low pressure system in case of a mechanical or electric failure. Any vapors released by three-way safety valve 30 can be routed to a flare (not shown). From three-way safety valve 30, the condensed liquids and uncondensed vapors flow through line 31 to point 33. Point 33 can also receive gas from gas to glycol separator 49.

Referring again to FIG. 1, the sources of methane and other hydrocarbon components created by the dehydration process will be described. In reboiler 18, the rich glycol is preferably heated by fire tube 42. In one embodiment, the temperature to which they are heated can be in excess of 300 degrees F., and can most preferably be to a temperature of approximately 400 degrees F. in order to drive off the absorbed water and hydrocarbon aromatics from the flowing gas stream as well as any entrained hydrocarbons. After regeneration, the dried glycol is referred to as lean glycol. The lean glycol preferably exits reboiler 18 through line 43 and flows downward through packing in gas stripping column 16 where, as previously described, it is further dried by the stripping gas flowing upward through the packing. The lean glycol exits gas stripping column 16 through line 44 and flows to glycol to glycol heat exchanger 45 where it is cooled by the rich glycol (the source of the rich glycol will be explained later). The cooled lean glycol exits glycol to glycol heat exchanger 45 through line 46 and flows into glycol storage 47. The lean glycol then preferably exits glycol storage 47 through line 48 and flows to suction port 50 of glycol pump 51.

In one embodiment, the gas that was used to partially drive glycol pump 51 is a major source of the methane and it is thus most preferably captured. In one embodiment, where electricity is available, an electrically-powered pump can optionally be used instead of glycol pump 51. From discharge port 52 of glycol pump 51, the lean glycol is preferably pumped through line 53 into gas to glycol heat exchanger 7. The dehydrated gas flowing through glycol to gas heat exchanger 7 further cools the lean glycol before it enters absorber 5 through line 54.

In one embodiment, the lean glycol flows downward in absorber 5, preferably contacting the flowing gas stream and absorbing water vapor and BTEX from the gas. The water and hydrocarbon-rich glycol, at high pressure, exit absorber 5 through line 55 and flows to particulate filter 56. The high pressure rich glycol preferably flows through filter 56, which can be a particulate filter, and exits through line 57. The high pressure rich glycol then preferably flows through line 57 to inlet port 58 of the hydraulic motor that drives the pumping mechanism of pump 51.

In one embodiment, the approximately 75% of the power required to drive the hydraulic motor on pump 51 can be provided by the high pressure glycol exiting absorber 5. In this embodiment, the balance of power, approximately 25%, is preferably supplied by gas entrained in the rich glycol flowing from absorber 5, which can optionally be formed primarily from methane. Of course other power percentages and ratios can be used depending upon a particular application.

The rich low pressure glycol preferably exits the hydraulic motor of pump 51 at outlet port 59 and flows through line 60 to glycol to gas separator 49. Glycol to gas separator 49 can separate the rich glycol from the entrained gas (mainly methane). As previously described, the rich glycol exits glycol to gas separator 49 and flows through line 86 to glycol to glycol heat exchanger 45. While flowing through glycol to glycol heat exchanger 45, the rich glycol can be heated by the lean glycol exiting gas stripping column 16 through line 44. The heated rich glycol exits glycol to glycol heat exchanger 45 and flows through line 61 into inlet 63 of still column on reboiler 18. As previously described, the effluent from the rich glycol preferably exits reboiler 18 at point 24 and flows through line 25 into effluent condenser 27.

As further illustrated in FIG. 1, gas, which can optionally be primarily methane, released from the rich glycol, preferably exits gas to glycol separator 49 through line 64 and flows to point 65. From point 65, the gas can either flow through line 66 to fuel gas regulator 67 or line 70 to backpressure regulator 71. Backpressure regulator 71 preferably maintains the operating pressure, which in one embodiment can generally be from about 25 to about 50 psig, on gas to glycol separator 49.

The fuel required to fire reboiler 18 can optionally come from two sources—either gas to glycol separator 49, or point 72 on sales gas line 28. The fuel gas connection at point 72 can preferably supply fuel gas only during start-up or an upset condition of the dehydrator. Under normal operating conditions, all of the gas required to fire reboiler 18 can come from gas to glycol separator 49. Under upset conditions or while starting the dehydrator, fuel gas can optionally be caused to flow from point 72 through line 73 to fuel gas regulator 74. Fuel gas regulator 74 is preferably set to supply fuel gas at a lower set pressure than the set pressure of fuel gas regulator 67. From point 69, fuel gas from either of fuel gas regulators 67 or 74, preferably flows through line 76 to burner 77.

As further illustrated in FIG. 1, gas from gas to glycol separator 49, which is not required to fire reboiler 18, preferably flows from back pressure regulator 71 through line 78 to point 33. At point 33, the waste methane and other hydrocarbon components created by the dehydration process preferably combines with the uncondensed vapors and condensed liquids and flows through line 32 to enter three-phased separator 34. Three-phased separator 34 preferably operates at approximately 4 ounces of pressure and separates the total stream into its condensed liquids and uncondensed vapor components. In one embodiment, the condensed liquids are further separated into hydrocarbon and water components. The hydrocarbon components are preferably pumped, by pump 35, to storage. In this embodiment, the water components are preferably pumped by pump 36 to a disposal location or storage location. The uncondensed vapors preferably exit three-phased separator 34 at outlet 37 and flow through line 38 to inlet 39 of compressor 40. Compressor 40 preferably compresses the uncondensed vapors and recovered gases from a suction pressure of about 1 ounce to about 12 ounces and most preferably from a suction pressure of about 4 ounces, to a discharge pressure of about 15 psig to in excess of 200 psig. From outlet 41 of compressor 40, the uncondensed vapors and recovered gas preferably flow through line 178 to point 79 and from point 79 can optionally be discharged through line 80. From point 79, when required to maintain a suction pressure on compressor 40, gas can flow through line 81, pressure regulator 82, and line 83 to point 84.

Although the foregoing discussion refers to the term "glycol" any other liquid drying agent can be used in place thereof. Although various glycol pumps can be used and will provide desirable results. In one embodiment, the glycol pump used is preferably a KIMRAY® or other similar glycol pump.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A dehydrator comprising:
   an absorber having an outlet in fluid communication with a first heat exchanger;
   an outlet of said first heat exchanger in fluid communication with a pressure regulator;
   said pressure regulator in fluid communication with a second heat exchanger;
   said second heat exchanger disposed at least partially in a re-boiler, said reboiler comprising a still column; and
   a stripping column comprising an inlet in fluid communication with an outlet of the second heat exchanger and said stripping column comprising an outlet in fluid communication with an inlet of said re-boiler.

2. The dehydrator of claim 1 wherein an outlet of said still column of said re-boiler is in fluid communication with a first entrance of a condenser.

3. The dehydrator of claim 2 wherein said condenser comprises a second entrance in fluid communication with said first heat exchanger.

4. The dehydrator of claim 1 further comprising an outlet of an inlet separator in fluid communication with said absorber.

5. The dehydrator of claim 1 wherein said re-boiler comprises a glycol reconcentrator.

6. The dehydrator of claim 2 wherein a first outlet of said condenser is in fluid communication with a gas sales line.

7. The dehydrator of claim 2 wherein a second outlet of said condenser is in fluid communication with an inlet of a three-phase separator.

8. The dehydrator system of claim 7 wherein a gas outlet of said three-phase separator is in fluid communication with an inlet of a compressor.

* * * * *